United States Patent [19]

Karras

[11] 3,917,915

[45] Nov. 4, 1975

[54] TELEPHONE SERVICE OBSERVATION SYSTEM

[75] Inventor: Ernest C. Karras, Chicago, Ill.

[73] Assignee: Tekno Industries, Inc., Oak Park, Ill.

[22] Filed: July 9, 1973

[21] Appl. No.: 377,575

[52] U.S. Cl. .......... 179/175.2 C

[51] Int. Cl.[2] .......... H04M 3/22

[58] Field of Search... 179/175.2 C, 175.3 R, 1 MN, 179/27 DB

[56] References Cited

UNITED STATES PATENTS

| | | | |
|---|---|---|---|
| 2,981,806 | 4/1961 | Middaugh | 179/175.2 C |
| 3,188,401 | 6/1965 | Barrett et al. | 179/175.2 C |
| 3,571,531 | 3/1971 | Rubin et al. | 179/175.2 C |
| 3,600,526 | 8/1971 | Pilkinton | 179/1 MN |
| 3,674,941 | 7/1972 | Guetta | 179/175.2 A |

*Primary Examiner*—Kathleen H. Claffy
*Assistant Examiner*—Douglas W. Olms
*Attorney, Agent, or Firm*—Laff, Whitesel & Rockman

[57] ABSTRACT

The invention provides a system for observing the grade of service on subscriber lines and trunks, checking intertoll equipment operation, and trapping abusive calls. The equipment monitors many circuits simultaneously, discriminating between originating and terminating calls, and automatically selects for observation a circuit initiating a call. The equipment accepts and displays dial pulse, E or M, "Touch Tone" or multi-frequency signaling, indicates on-off hook conditions, and returns supervision. A manual assignment switch enables selective surveillance of a particular circuit for trapping abusive callers or monitoring conversations on a line. An optional unit may record observed data to provide for future analysis.

32 Claims, 5 Drawing Figures

TELEPHONE SERVICE OBSERVATION SYSTEM

This invention relates to service observation for telephone systems and, more particularly, to means for recording the quality or grade of service being given by a telephone system.

Each year, telephone companies lose great sums of money on incompleted telephone calls. Each time that a calling subscriber station goes off-hook, very expensive switching equipment is tied up. If the call is abandoned before it is completed, the telephone company receives no compensation whatsoever for this use of the equipment. It is irrelevant that the equipment was tied up only a brief period of time because the number of equipments furnished in the switching system must be adequate to cope with these incompleted calls.

Delays in completing calls have a similar effect. If a call requires, say twenty percent (20%) extra time to complete a connection, twenty percent (20%) extra equipment must be provided to compensate therefor.

Accordingly, regardless of the reasons why switching equipment is not used efficiently, there is a need for the telephone company to be aware of all inefficiencies and the causes thereof.

The equipment for detecting these problems is commonly called "service observation equipment." Among other things, observation equipment of the described type should be able to monitor traffic on specific lines or trunks, display the digits dialed, time the periods required for each switching function to error, enable information to be recorded, and accept a great variety of different types of signaling. Special types of calls, such as abusive calls, malfunctions and the like should also be identified and trapped, if necessary.

Some of these and other functions have been provided in the past. However, as a generality, the observation equipment has not been modern and flexible and has been too bulky, heavy, and expensive. Also, the equipment has not always provided flexibility for enabling either manual real time analysis or stored data for later analysis.

Accordingly, there is a need for modern and up-to-date service observation equipment.

Therefore, an object of the invention is to provide new and improved service observation equipment. Another object of the invention is to provide an all electronic, lightweight, portable service observation equipment. Here, an object is to provide an easily connected and disconnected observation system. A further object is to provide a plurality of optional attachments which facilitate either manual real time analysis or recorded data for future analysis.

Still another object of the invention is to provide means for monitoring a plurality of trunks or lines simultaneously. A further object is to automatically select originating circuits for observation, display circuit number, dialed numbers and elapsed time for call functions. Yet another object is to provide for audio surveillance of conversations with time-out control. Still a further object is to provide means for accepting dial pulses, or E or M, T.T. and M.F. signaling. Yet another object is to provide switch train locking features for trapping abusive callers or tracing troubled circuits.

In keeping with an aspect of the invention, these and other objects are accomplished by electronic equipment for observing the grade of service on subscriber lines and trunks, checking intertoll equipment operation, and quickly trapping abusive callers. The equipment monitors many circuits simultaneously, discriminates between originating and terminating calls, and automatically selects for observation a circuit initiating a call. The equipment accepts and displays dial pulse, E or M, "Touch Tone" or multi-frequency signaling. Special data outputs provide means for automatically controlling a pen recorder, tape recorder, or tape punch to establish a permanent record of the data accumulated while observing calls. A manual assignment switch enables a selective surveillance of a particular circuit for trapping abusive callers.

The equipment uses reliable, discrete and integrated solid-state circuitry, mounted on interchangeable plug-in printed circuit boards. All components are housed in a rugged aluminum chassis and enclosed by an attractive metal cabinet. A lightweight carrying case and clip-ended input cables are also available to provide a completely self-contained unit for portable use with more than one central office or PBX.

The nature of a preferred embodiment of the invention for accomplishing the above and other objects is shown in the attached drawings wherein:

FIG. 1A a perspective view of the portable service observation equipment incorporating the invention;

Figure 1A:
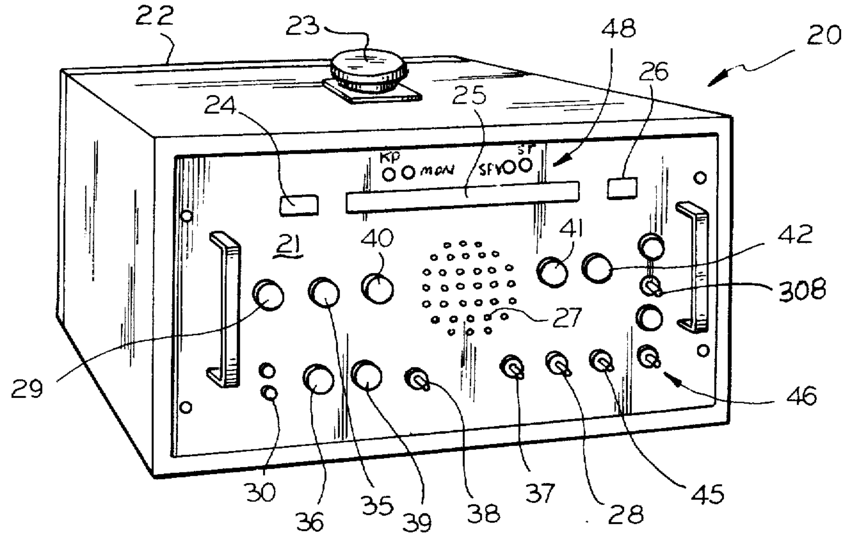
FIG. 1B is a perspective view of a call disposition recorder.
Figure 1B:
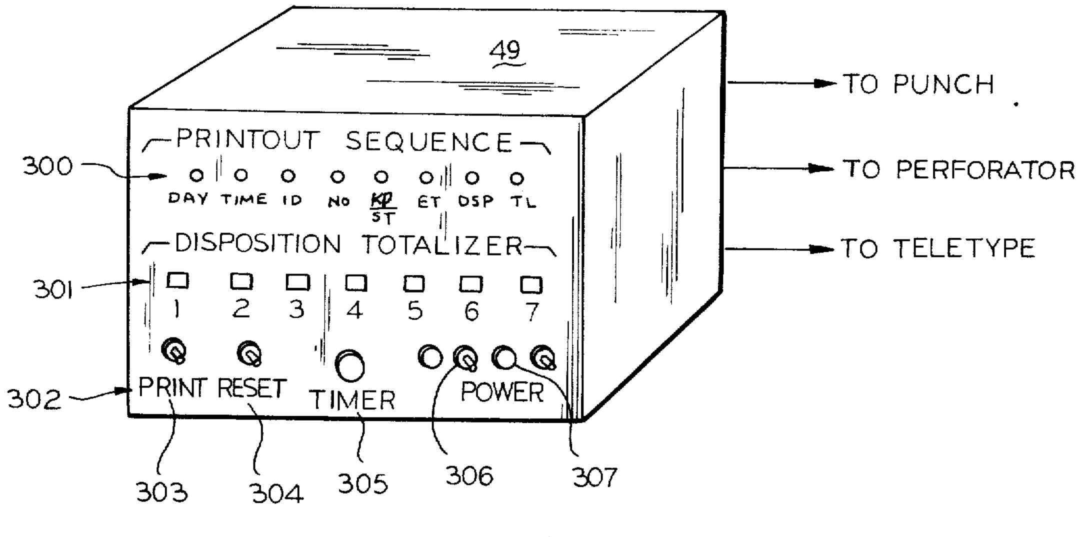

Both the service observation equipment 20 (FIG. 1A) and the optional recorder of FIG. 1B are housed in a lightweight portable case. On each unit, there is a cover, not shown, which fits over the front panel 21 of the case to cover the controls during transportation. A rear cover also fits over the back of the case to enclose cables and leads which are used to connect the observation equipment to a switching system via either two or four wires. A data output jack is also enclosed inside the back cover 22 to feed data to any suitable printout display means. A blower 23 is mounted on top of the case to draw cooling air through it.

On the control panel 21 are a number of windows 24-26 which display alpha-numerical symbols in any well-known manner; however, light-emitting diodes are preferred. A telephone number dialed by a calling subscriber, perhaps up to fourteen digits, is displayed in window 25. The equipment number of a circuit being observed is displayed in window 24. The total elapsed time during which the trunk or line is observed is displayed in window 26.

A loud speaker 27 behind the panel grill enables an operator, worker, or repairman to monitor the audio on the observed line to determine the quality of transmission. The monitor speaker is switched off and on by a switch 28, and volume is controlled by a knob 29. Jacks 30 provide for optional and alternative use of headphones.

Two knobs 35, 36 enable the operator to either manually or automatically select a particular one of the observed lines for special attention. If switch 35 is set to a particular line, or trunk, the equipment remains connected to that line or trunk and gives suitable alarms or signals for everything occurring thereon. If switch 37 is operated, an alarm sounds when the line originates a call. The knobs 35, 36 may also be used to trap annoyance calls or trace troubles. If the system is controlled to monitor a given line, the switch 38 may be operated to apply a holding ground to that line. Then, the switch train will not be released until switch 38 is reset. Therefore, the inventive system may be used for trapping annoyance calls or tracing troubled circuits.

The knobs 39-41 may be adjusted to select the various forms of signaling. For example, these knobs may select between open loop dial pulsing, "Touch Tone" signaling, multifrequency or E and M signaling, and digit absorption. Knob 39 enables selection of either incoming E or outgoing M calls over two-way E and M trunks. The digit absorption eliminates any suitable number of prefix digits which are irrelevant to the observation.

The switch 45 is used to reset or preset the system whenever it is necessary to stop or restart the cylic monitoring process.

Switch 46 provides means for applying and removing the electrical power to the system.

A plurality of monitor and supervision lamps 48 may be used to display any suitable conditions on the line such as busy, idle, dial pulsing, E or M lead, signaling, and the like. The two outside lamps indicate KP tone and ST tone, respectively, which occur during multifrequency E and M signaling.

The call disposition recorder 49 (FIG. 1B) is an optional unit which plugs into the data output jack inside the back cover 22 on the observation unit 20. This disposition recorder makes a semi-permanent record of the data which is derived by the observation unit. The recorder may also be attached to any suitable supplementary units such as a card punch, tape perforator, or teletype printer which may make permanent records.

Figure 2:
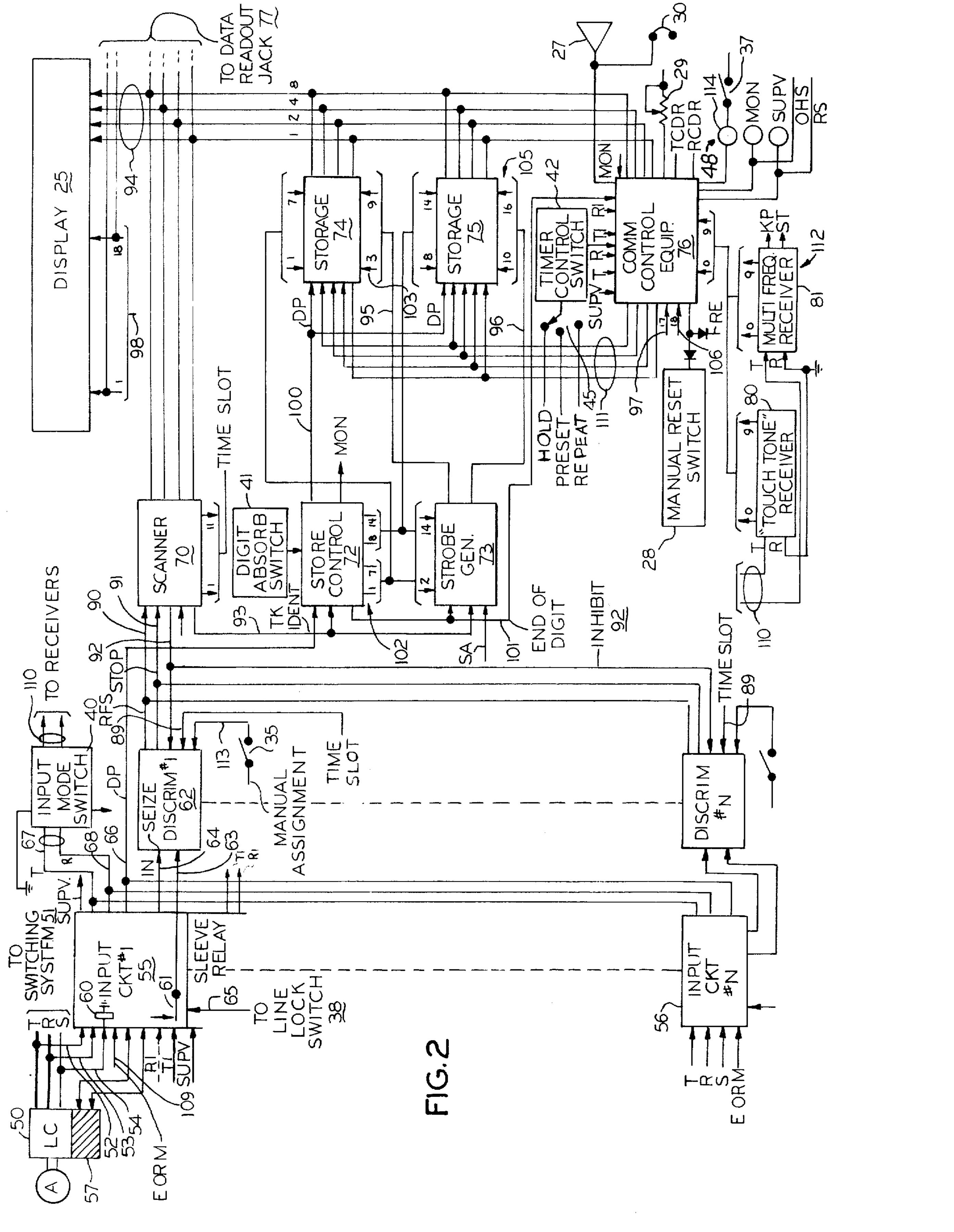
FIG. 2 is a block diagram of the service observation equipment.
Figure 4:
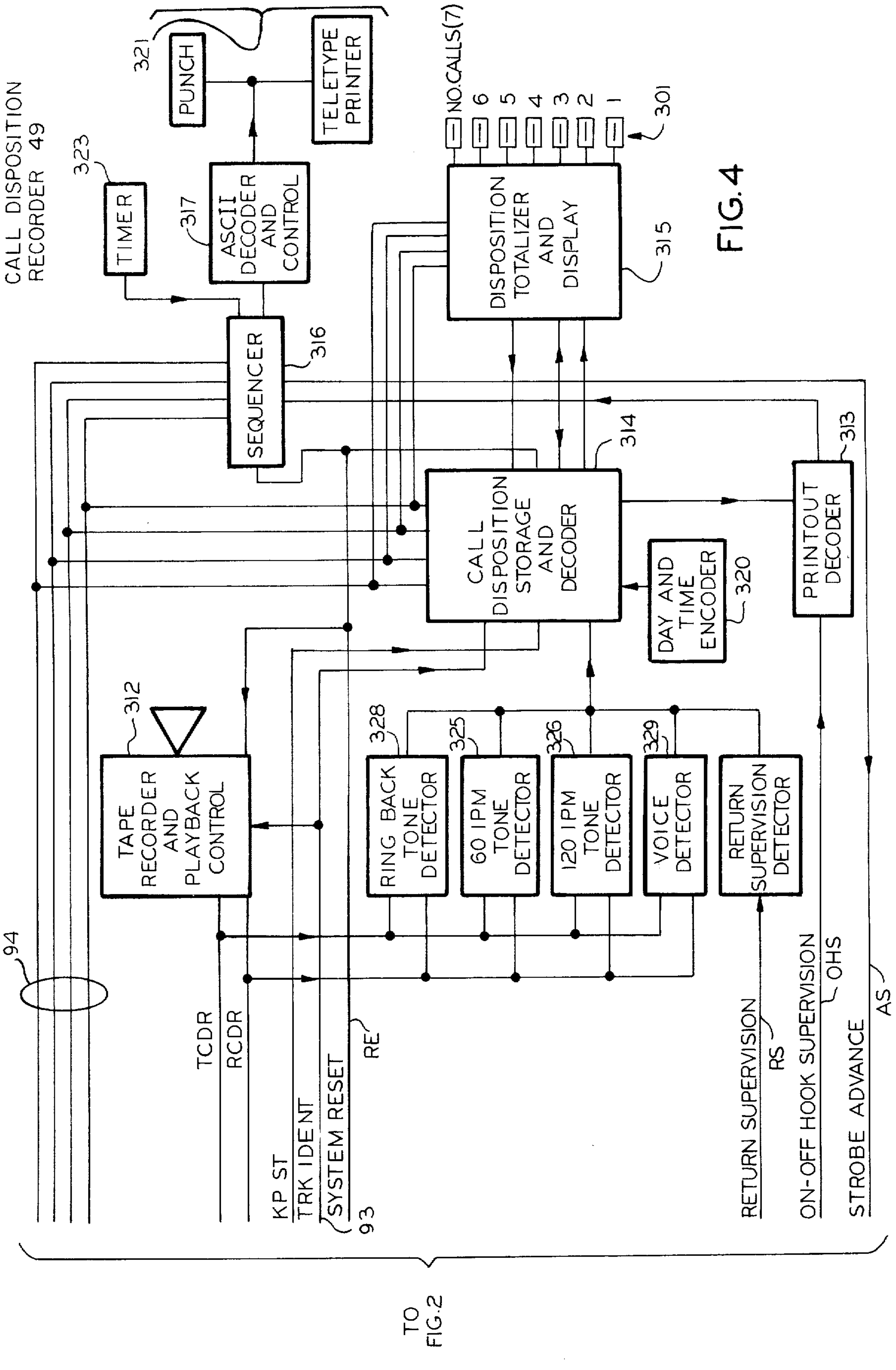
FIG. 4 is a block diagram of an optional call disposition recorder.

The electrical circuits for performing these observer 20 functions are shown generally by the block diagram of FIG. 2, and the electrical circuits for performing the call disposition recordings are shown in the block diagram of FIG. 4.

These circuits for the call observation unit may be connected to either a line or a trunk circuit via the well-known tip, ring, sleeve or E or M wires. By way of example, the drawing shows a subscriber station A connected to a well-known line circuit 50 having tip, ring and sleeve leads T, R, and S leading to any suitable switching system 51. At each of a plurality of such lines being observed, its tip, ring, and sleeve leads 52, 53, 54 are connected to the terminals of an individually associated observation input circuit 55. Hence, the first input circuit 55 is connected to the first line or trunk under observation, and the last or Nth observation input circuit 56 is connected to the last line or trunk under observation. The dashed line indicates that any suitable number, such as thirty, for example, of similar input circuits may be connected in a similar manner.

The line circuit 50 is here shown as having a shaded rectangle 57 at the bottom thereof for indicating a four wire system. Sometimes telephones have four wires, instead of the usual two wire, tip and ring. In this case, the leads T and R are the tip and ring send pair and the leads T1 and R1 are the tip and ring receive pair. The signals on these tip and ring leads are preferably mixed together inside the input circuit 55, whereby the observation equipment may monitor their operation, as if they were a two wire system. The receive pair T1 and R1 are also connected to the common equipment 76.

Each input circuit 55 contains a relay 60 which controls its contacts 61 for forwarding a busy or idle signal to an individually associated discriminator circuit 62 via a sleeve relay wire 63. Another wire 64 is marked as a seizure signal whenever the input circuit serves a line in an unanswered calling condition. The ground for holding or trapping a call is applied from switch 38 to the input circuit 55 via wire 65. Dial signals are transmitted from the line circuit 50 over the tip and ring leads T and R to the switching system 51 and simultaneously over wires 52, 53, to the input circuit 55. These signals are repeated to a store control circuit 72 via wire 66. The wires 67 and 68 are used for forms of signaling other than loop pulsing, such as "Touch Tone" and multi-frequency signaling.

The remaining blocks in FIG. 2 include a scanner 70, digit absorbing switch 41, digit store control circuit 72, a strobe generator 73, and read out digit storage circuits 74, 75 for feeding digits to the display device 25 and to a jack 77 on the back of the portable unit 20. Any suitable display unit, such as a cathode ray tube, computer input, printer, or perforator may be plugged into this jack.

The common control equipment 76 provides an interface between the read out digit storage devices and various controls seen in FIG. 1.

Each of these ten basic circuits performs a logic function which together make up the total observation system concept. Each of the thirty or so individual line or trunk input circuits 55, 56 monitors the tip side of an individually associated line or trunk for off-hook supervision and dial pulse detection. The sleeve lead is monitored for ground, and the circuit accepts dial pulses from the E or M leads. Simultaneously, the circuit monitors both tip and ring for voice or audio signaling. In the four wire applications, the receive leads T1 and R1, and the supervision lead SUP are also connected for audio monitoring and return supervision.

Each trunk input has an individually associated discriminator circuit which provides the logical functions required for automatically selecting an originating call and eliminating in-process or terminating calls.

The scanner circuit 70 provides a sweeping function which individually enables each of the trunk inputs responsive to a series of identifying time slots, thus providing means for making a random selection of any one of the inputs 55. When the scanner 70 stops on an input circuit for observation, it reads out the time slot of the input to the display 25 and the jack 77 to provide a circuit identification number display at 24 or read out record at 77.

The store control circuit 72 acts as a router by determining the proper timing for an incoming pulse which must be recognized as a dial pulse (or other forms of dial signals) and by routing each series of dial pulses to the proper storage bin at 74, 75 for subsequent display or read out. If the switch 41 is operated, the store control 72 counts any predetermined number of dial signals before routing them to the storage signals, thereby absorbing certain prefix or preliminary signals.

The strobe generator 73 has a dual function of conserving power and concurently decreasing the unit size of the housing of FIG. 1. One at a time, it pulses or enables each storage bin in circuits 74, 75, and causes them to transfer their contents on the display 25 and jack 77 at a very rapid speed. This high speed strobing displays one digit at a time by pulse lighting lights at a speed which the human eye, or other sense organ, integrates display without detecting an off period. Thus, the strobing technique eliminates superfluous power and decoding requirements which would otherwise necessitate duplicate gates, buses and other display means.

The storage circuits 74, 75 include fourteen storage bins, one for each digit indicator of the display 25. The number of digits, fourteen, is based on current United States telephone numbering plans which include seven digit directory numbers, three digit area code numbers, and up to four other numbers including prefix digits and equipment identification in some systems. Hence, this capacity of fourteen digit bins may display the entire number called by the calling subscriber.

Each bin in circuits 74, 75 accepts 1-10 dial pulses from the store control 72 and retains them until the system is either automatically or manually reset.

The common equipment 76 provides the audio amplification which drives the speaker 27, the elapsed time count for the display at 26 (FIG. 1), timing for the automatic reset, and the decoding for interfacing the service observation unit "Touch Tone" and multi-frequency receivers 80, 81 to the storage units 74, 75.

It should be noted that the invention provides a method of detecting control signals appearing on a telephone line. The signals may be either a series of successive dial pulse trains or a succession of combinations of multiple frequency tone signals. In some cases, these two forms of signals are mixed, as when a subscriber has a rotary dial and a telephone central office sends along with the dial pulses, certain other pertinent information in the form of multi-frequency codes.

Each of the storage means 74, 75 comprises a decade counter comprising a binary counter having four flip-flops (not shown). The series of dial pulses are fed into a trigger input DP on the counter via lead 100. The multiple tone signals are detected by suitable detectors at 80 or 81 and decoded by the common control equipment 76. Then, the decoded signals are fed out from the common control equipment 76, in parallel, over wires 111 to directly set the four counting flip-flops according to the numerical value indicated by the received frequencies. This way, either trains of serial dial pulses or parallel signals produce the same result in the storage circuits 74, 75.

The inventive system is designed to store and display information relating to all selected events occurring during a call under observation. In addition to call events, the system also displays information relating to an identification of equipment involved in the call. Thus, for example, the identity of line circuit 50 is known from the connection made to the inputs of circuit 55 when the observation circuit is connected into the telephone system. The scanner 70 sequentially pulses out on the time slot leads 89 of the individually associated discriminator circuits 62. Responsive to a signal wire 91, the scanner stops to enable a particular input circuit to operate. Therefore, the stopped position of the scanner identifies the line circuit 50 then associated with the discriminator 62.

The system also displays the time of an event's occurrence. More particularly, a time switch 42 provides timing signals to the common control equipment 76 for selectively displaying the time between each of the successive events causing the information then being displayed.

If the switch 45 is moved to the disable position, the timer 42 is placed in a condition where all information is displayed for an indefinite time period under manual control. The display is for an automatically measured and predetermined time period when switch 45 is moved to the preset position. After the end of the time period, all displayed information is erased. If the switch 45 is placed in the repeat position, the timer 42 resets itself a selected number of times for automatically expanding the measured time period by multiple amounts.

Depending upon internal adjustments, the common control equipment 76 may respond to each recorded event by resetting the time display. Hence, the display then shows the period required between each of the successively observed events. On the other hand, if another internal adjustment is made in the common control equipment 76, the measured time as displayed is the total cumulative time period, beginning with seizure and continuing thereafter throughout the entire call under observation.

The display 25 preferably has eighteen seven-segment light-emitting diodes, a set of strobing gates, and decoders. The strobe generator 73 controls the gates which, in turn, connect the decoders with the proper storage bin and the light-emitting diodes in display 25 to indicate the information shown on the display. The "Touch Tone" receiver 80 includes seven separate tone filters which separate the tones to decode them in combination of two frequencies. These filters enable the equipment to provide to the common equipment 76 a decimal output of 0-9 digits. Similarly, the multi-frequency receiver 81 contains six tone filters and provides means for decoding signals into 0-9, KP, and ST in outputs in parallel with the "Touch Tone" receiver output to the common equipment.

With this brief description of the equipment in mind, it is thooght that the nature of the invention will be best understood from the following description of the operation thereof. It will be assumed that the input circuit 55 is connected to a balanced subscriber line circuit having tip, ring, and sleeve conductors.

When the subscriber station first goes off-hook, the tip side 52 of the line, which is normally at ground, goes negative, according to the subscriber's loop impedance. To avoid response to transients, this negative condition must persist for more than twenty milliseconds. Then, the input circuit 55 recognizes that it has a legal off-hook condition as distinguished from a transitory voice signal or noise condition. Responsive thereto, circuit 55 applies an "In" signal over wire 64 to its individually associated discuminator circuit 62 which, in turn, generates a request for service (RFS) signal on wire 90.

The scanner 70 reads out a series of cyclically recurring pulses forming sequential time slots which individually identify each of the input circuits 55-56. The time slot pulses are read out sequentially at a 1 kHz rate. When the individual identifying time slot pulses appear on wire 89, the one circuit 62 which is individually identified thereby responds.

The discriminator 62 recognizes its own time slot and that circuit 55 is asking for service. It then places, via wire 91, a stop command on the scanner 70. The scanner responds by disabling all other discriminators by generating an inhibit signal on wire 92. Then, the input circuit 55 closes a circuit to extend the tip and ring conductors 52, 53 to the input mode switch 40 and to an audio amplifier (not shown) in FIG. 2. The input circuit 55 also switches the dial pulse lead 66 to the store control circuit 72. When a four wire system is used, the input circuit also switches the wires T1, R1, and SUPV.

When the scanner 70 stops, responsive to the signal on wire 91, it also generates an input circuit identification signal which is applied to the strobe generator 73 via wire 93. The output of the scanner also causes a read out of the input circuit 55 time slot identification in binary form over the 1, 2, 4, and 8 gate leads 94 extending to the display unit 25 and the data read out jack 77.

Responsive to the signal on wire 93, the strobe generator 73 begins to generate trigger signals which are applied at a kHz rate to the strobe busses (gate 95, 96). These trigger signals coincide with the stored time slot signals which are sent from storage circuits 74, 75 over the busses 94 to the display circuit 25 and to the data jack 77. At wire 97 a time slot signal starts a one second counter (not shown) in the common equipment 76. The identification signal on the wire 93 also activates the store control circuit 72 to advance the circuit from a store O position to a store 1 position, thus preparing the storage circuits 74, 75 to store digits in the first storage bin.

Responsive to dialing by the subscriber, ground pulses appear on the tip conductor 52. Each pulse is conveyed by the input circuit 55 over an associated dial pulse lead 66 to the store control circuit 72. It, in turn, shapes the pulses and feeds them in a serial fashion over the DP lead 100 to a pair of storage circuits 74, 75 where the digits are successively stored in bins (not shown).

As the dial pulses enter the store control 72, it looks for a space of 250 ms. or more between successive digit pulses which indicates an end to a dial pulse train. When this space is detected (meaning the end of the first digit), circuit 72 generates an end of digit signal on wire 101 and advances to its store 2 position at outputs 102. The store 2 signal enables a strobe 3 at output 103 of the strobe generator. This strobe 3 signal enables the storage circuit 74 to gate the information stored in its first bin onto the 1, 2, 4, 8 busses 94 for causing a display at a 1 kHz rate by the display circuit 25 and at the data read out jack 77.

As each succeeding digit is subsequently dialed, the same functional sequence reoccurs until after the fourteenth digit has been dialed, stored and read out. At that time, the end of digit signal on wire 101 also enables its display. All digits are now displayed at 25 and at data jack 77. Each time a digit is dialed the counter (not shown) in the common equipment 76 is reset to 00, and a timeout timer is also recycled to zero.

Briefly, in resume, an off-hook signal on a subscriber or trunk line under observation causes input circuit 55 to place a demand through discriminator 62 to the scanner 70. The scanner sends out cyclically recurring time slot signal pulses until a discriminator circuit 62 recognizes its signal on wire 89. Thereupon, discriminator circuit 62 stops the scanner 70, which, in turn, inhibits all other discriminators via lead 92. When dial pulses appear on the tip or ring, they are forwarded from input circuit 55 over lead 66 and through store control circuit 72 to storage circuit 74, 75. At the end of each dial pulse train, signals appear simultaneously on wires 101, 102 to advance the strobe generator 73. It then enables a storage of the next digit in the next available pin, at the control inputs of the storage circuit 74 or control inputs of the storage circuits 75. Each time that the strobe so advances, at the end of one dial pulse train, the next digit is stored in the circuits 74, 75.

Meanwhile, the strobe 73 is a free running affair sequentially pulsing leads 98 on the display circuit 25. Each time that the strobe pulses any one of the leads 98, 103 or 105, the corresponding digit is read out of storage at 74, 75 and applied via busses 94 to activate the display 25. This way, the display 25 reads out all of the digits dialed by the calling subscriber. Special strobe leads 106 and 97 strobe and display elapse time via lead 94.

The foregoing descriptions refer to dial pulsing of the open loop variety. However, the system is also adapted to observe lines and trunks using other forms of signaling as well.

If the E or M lead 109 of a trunk circuit are connected to the input circuit 55 for supervision and dial pulse detection, the tip and ring conductors 52, 53 are unenergized or dry. These conductors are then used only to convey audio to voice amplifier and tone receivers. According to E and M lead signaling techniques, a valid seizure or dial pulse is a D.C. signal between 22 V and 50 V, persisting longer than 0.5 ms, appearing on the E or M lead 109. Responsive thereto, circuit 55 energizes wire 64, as a request signal for service. The digital signals on the dial pulse lead 66 are transmitted through the store control circuit 72 for causing a digital storage at 74, 75, as previously described.

When the service observation equipment is connected to a "Touch Tone" line, D. C. supervision is received over the tip side of the line, and dial signals are two frequencies transmitted over tip and ring 52, 53. The mode switch 40 is is operated, and the tip and ring conductors 67, 68 are connected through switch 40 to wires 110 leading to the "Touch Tone" receivers 80. As the tones identifying dialed numbers appear across the tip and ring, conductors 67, 68, the tone receiver filters 80 detect and validate them. The various combinations of tones are decoded to a form 0-9 decimal output which are presented in parallel fashion to convertors in the common equipment circuit 76. The common equipment 76 then converts these signals into a binary logic form which is presented to the 1, 2, 4, 8 busses 111 leading to the storage circuits 74, 75. At the end of each digit, the common equipment 76 generates an end of digit signal to sequence the storage, strobing, and display of the dialed numbers, as previously described.

The service observation circuit may also be seized via either tip 52 or the E or M lead 109 on a multi-frequency signaling trunk, as described previously. Similar to the "Touch Tone" mode of operation, a multi-frequency tone appears across the tip and ring conductors 52, 53 representing dialed numbers. The multi-frequency receiver filters 81 receive these frequencies via the input mode switch 40 and the conductors 110. Filters 81 discriminate to determine that only two tones of the proper and well-known frequency level and duration exist. The various tones are decoded into 0-9 decimal signals, a start dial signal (KP), and a stop dial (ST) signal at the output 112. Again, D. C. logic levels are presented in a parallel fashion to the common equipment 76, the multifrequency tones are converted, stored and displayed in the manner of the "Touch Tone" signals and display. The audio may be monitored on both a two, or four wire basis, whereby the signal inputs from both the send and the receive conductors T, R, T1, R1 are mixed by the "common equipment" prior to their entering the speaker 27.

A monitor lamp MON indicates on-off hook condition on either the tip T or the E and M leads. A SUPV lead is connected to either the E or M lead to indicate return supervision.

In all modes of service observation and line monitoring, the sleeve lead 54 plays an important role for causing a selection of calls responsive to the origination of a call. If the sleeve lead potential on wire 54 indicates a busy signal before the receipt of a seizure signal, the system locks out. More particularly, the sleeve relay 60 closes contacts 61 and thereby marks lead 63 to prevent a request for service signal (RFS) on line 90. Similarly, if a circuit is already busy when the system resets to accept another call, the signal on the sleeve relay lead 63 prevents a selection of that circuit.

To permanently stop the scanner 70 on a particular input circuit 55, the manual assignment switch 35 must be placed on the desired circuit number. The switch then applies a ground on the lead 113 of the associated discriminator circuit 62. Then, the service observing is effectively dedicated to the observation of one line. This dedication may be used in conjunction with the line lock switch 38 and wire 65 to trap annoyancy calls and trace troubles or with speaker 27 to monitor a line.

If a switch 37 is closed, an alarm 114 is sounded whenever a call appears on the line. This way a person may be summoned to observe the line condition. A manual reset switch 28 controls the total system via the common equipment 76. Upon activation thereof, a ground signal is applied to all the circuits, resetting the storage binsto00 and discharges all timers. Reset also stops the strobe generator and starts the free-running scanner 70.

If the system has connected itself to a line or trunk and has information data relative thereto stored, it continues to display this data at 25 and at jack 77 until a reset bus is energized responsive to operation of a manual switch 28. Alternatively, the timer setting of the control switch 42 may be operated automatically to establish a constant observation period. When the dial pulse lead 66 is originally marked, it starts the timing of the observation period. After each end of digit signal is generated, the timer 42 is reset. Also, if prior to timeout, a switch 45 is depressed, the timer recycles. If, instead, a switch 45 is placed in a disable position, it completely removes the timeout control from the timer 42, thus stopping its cycle indefinitely. When returned to the reset position, the timer times out and reactivates the operation.

Figure 3:
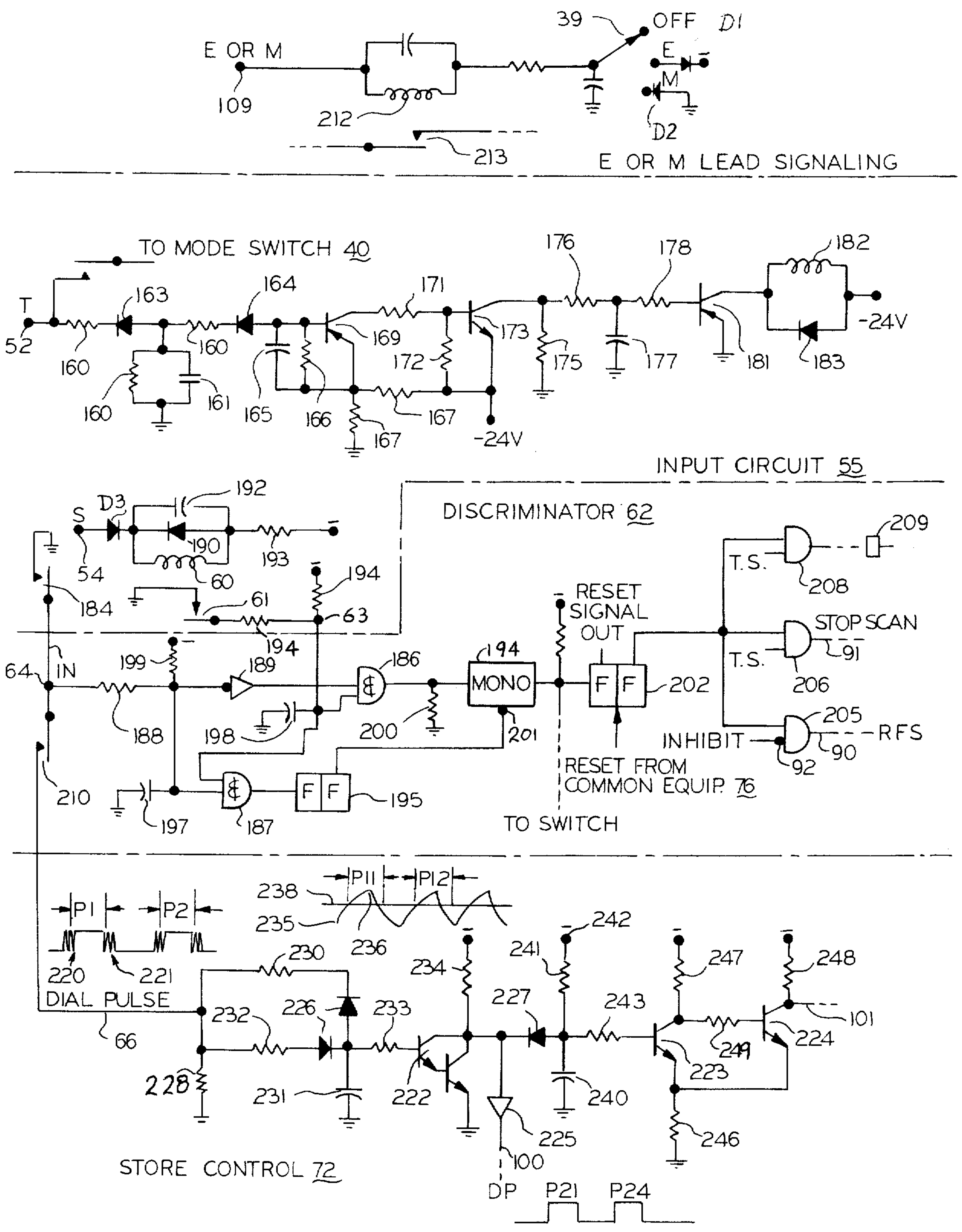
FIG. 3 is a schematic circuit diagram showing some of the circuits used to complete the blocks of FIG. 2.

The details of the input circuit 55 are drawn near the top of FIG. 3, the discriminator 62 is shown near the middle, and the store control 72 near the bottom. Again, the input circuit and discriminator detect a busy condition on the line being monitored and determines whether a call is incoming or outgoing. Originating calls are distinguished from terminating calls by the condition of the sleeve lead 54 with respect to the condition on the tip lead. Originating calls place a battery potential on the tip lead 52 before ground potential appears on the sleeve lead 54. Ground on the sleeve before battery on the tip is a terminating call.

In the input circuit 55, the three resistors 160 and capacitor 161 form a timing circuit for accepting valid demand signals while rejecting transitory signals on the line. The diodes 163, 164 reject spikes and transitory signal changes appearing on the line 52. Capacitor 165 provides a high frequency by-pass, and resistors 166, 167 provide bias for transistor 169, which acts as a DC electronic switch.

Resistor 171 provides coupling and resistor 172 provides base bias for switching transistor 173. The resistor 175 is a collector load for transistor 173. Resistors 175, 176 and 178 provide coupling and timing functions in conjunction with capacitor 177.

Transistor 181 provides driving power for operating the relay 182. Diode 183 discharges any reverse EMF generated in the winding of the relay 182. When relay 182 operates, its contacts 184 close preparatory to an energization of the "In" lead 64, seen also in FIG. 2.

The sleeve lead 54 is connected to a relay 60 in parallel with a reverse EMF suppressing diode 190, and capacitor 192. Diode D3 also prevents reverse EMF effects. Resistor 193 provides for current limiting. Whenever the line is busy, relay 60 operates to close contacts 61 and ground the sleeve relay lead 63, which is before any line seizure signal. If the line is idle, relay 60 is not operated, and contacts 61 are open at the time of seizure.

In operation, a valid seizure signal in the form of battery potential which persists for a substantial time duration appears on the tip lead 52. This potential appears at the base of and turns on transistor 169, which turns on in succession transistors 173 and 181. Relay 182 operates and closes contacts 184 to ground the "In" lead 64. This ground of the "In" lead provides on input to AND gates 186, 187 applied through resistor 188 and invertor 189. The other input of AND gates 186, 187 are marked by battery if the sleeve lead 54 is not busy marked (i.e., at ground), relay 60 is not operated, and contacts 61 are not closed. The output of AND gate 186 causes a pulse to occur on the output of a monostable multivibrator 194. Flip-flop 195 is set when relay 60 operates to mark one input to AND gate 187 and when the input circuit 55 closes the contacts 184 to mark the "In" lead 64 and the other AND gate input. The resistor-capacitor timer circuit 188, 197 requires the "In" lead 64 to be marked for a discrete period of time before there is a response in discriminator 62. This delay helps prevent faulty response to contact bounce or line noise. Capacitor 198 also contributes to the timing in conjunction with resistors 194. Resistors 199, 200 provide bias.

The timing is such that the tip potential must appear on the "In" lead 64 before ground appears on the sleeve relay lead 63 before the monostable circuit 194 can outpulse. (This sequence of events occurs on originating call.) However, if the busy ground appears on the sleeve relay lead 63 before the tip potential appears on "In" lead 64, capacitor 198 has changed before capacitor 197, and the flip-flop 195 operates first to inhibit the monostable 194, as indicated in the drawing by the heavily inked dot 201. (This sequence of events occurs on terminating calls.) Hence, the monostable flip-flop 194 pulses the flip-flop 202 only if the call is an originating — not terminating — one.

Responsive to the output of the flip-flop 202, when no other input circuits 55 are previously busy and inhibited via lead 92, a request for service signal (RFS) is made by the output of AND gate 205 when there is an output from flip-flop 202. The request for service signal (RFS) is made by the output of AND gate 105 when there is an output from flip-flop 202. The request for service signal (RFS) on wire 90 causes the scanner 70 to generate time slot signal pulses for identifying each of the various circuits. When the time slot identifying the requesting input circuit 55 occurs, AND gate 206 conducts to give a "STOP SCAN" signal.

Responsive to the STOP SCAN signal on wire 91, the scanner 70 returns an inhibit signal on wire 92 to prevent the output of a gate corresponding to gate 205 in any other discriminator circuit 62, thereby also terminating the request for service signal (RFS).

Also responsive jointly to a time slot signal and the output of flip-flop 202 (signaling originating call), AND gate 208 conducts to operate relay 209. Among other things, relay 209 closes contacts 210 to extend the "In" lead marking and place a demand on the store circuit 72 via the dial pulse lead 66. Later, during dial pulsing, the flip-flops 195 and 202 are locked in so that they do nor respond. Relay 182 releases and reoperates and it contacts repeat each dial pulse to the store control circuit 72.

When E or M lead signaling is used, a relay 212 (near the top of FIG. 3) operates in a manner similar to the operation of relay 182 to repeat dial pulses in a similar manner via contacts 213. Switch 39 selects between the potentials which must be applied to match the potentials on the E or M wires. Diodes D1, D2 prevent adverse effects from reverse EMF.

Means are provided in the store control circuit 72 for accepting valid dial pulses while rejecting noise, false signals, contact bounce, and the like. More particularly, the store control circuit 72 (FIG. 3) receives dial pulses P1, P2, which may begin or end with noise spikes, as at 220, 221. Unless restrained, any of these noise spikes could trip a dial pulse detector and make it appear that extra dial pulses have been received. The store control circuit 72 includes means for preventing such false repsonse.

In greater detail, the principal parts of this store control circuit 72 comprises three transistors 222-224, a dial pulse shaping amplifier 225, and a pair of diodes 226, 227. In addition, the circuit includes resistor 230 which cooperates with capacitor 231 to form a dial pulse "make" ratio times and resistor 232 which cooperates with the capacitor 231 to form a "break" ratio dial pulse timer. Resistor 228 provides a timer discharge path to ground. The diodes 226 isolate the make-break timing circuits according to the polarity of the moving dial pulse edge. The resistor 233 provides isolation and current limiting to the base of the first transistor of a Darlington configuration 222. Resistor 234 is a collector load which also providess a normal reverse bias to the diode 227.

Means are provided for shaping the input dial pulses to eliminate noise. More particularly, the Darlington circuit 222 has a firing characteristic, as shown at P11, P12 . . . From a normally off bias condition, at 235, the capacitor 231 charges and voltage rises on the base electrode of the first Darlington transistor. When the charging voltage on capacitor 231 exceeds a threshold level 238, the Darlington circuit fires. The charge on capacitor 231 continues to rise until the dual pulse P1 disappears. All of the noise spikes 220, 221, are integrated into this dial pulse by the charge being stored on the capacitor 231. After the dial pulse disappears at 236, the charge begins to disappear. When the charge falls below the level 238, the Darlington circuit switches off. As a result, the Darlington was switched on, then off, for a period P11 which is approximately equal to a standard pulse period. Therefore, the amplifier 225 energizes a dial pulse lead DP 100 for a dial pulse make period, as shown at P21, lead DP 100 for a dial pulse make period, as shown at P21, P22 . . .

The remainder of the circuit forms an end of dial pulse train detector. In greater detail, each time that the Darlington circuit 222 conducts a ground voltage forwardly biases the diode 227 to discharge capacitor 240, which cooperates with resistor 241 to form a timer. When the Darlington circuit 222 turns off, its emitter ground potential is removed from the circuit and the capacitor 240 charges through the resistor 241 to the battery terminal 242. If no dial pulse reappears, the capacitor 240 has enough time to charge to a level sufficient to switch on the transistor 223. Resistor 243 provides current limiting coupling.

The transistors 223, 224 are connnected in a Schmidt trigger configuration with a common emitter bias resistor 246. Resistors 246, 249, respectively, provide emitter bias, collector loading, and coupling.

Depending upon circuit constants, the capacitor 240 charges sufficiently in about 250 milliseconds to fire the Schmidt trigger 223, 224, and send an end of dial pulse train signal over wire 101. Accordingly, the store control circuit 72 includes a pulse detector means for detecting series of successive pulses which make up an apparently valid pulse train. The dial pulse detector comprises means in the form of Darlington Circuit 222 for recognizing pulse make and break periods having a predetermined make-break ratio range. In a preferred embodiment, the range of the acceptable break periods is 44% to 72% of a pulse period at ten pulses per second. Obviously, therefore, the make ration must be in the range of 56% to 28%. The RC timer 226, 230, 231, 232 integrates all signals appearing within the predetermined make range, comprising the 56% to 28% of the pulse period, whereby contact bounce and similar noise conditions are integrated into a single make period. The capacitor 240 and Schmidt trigger 223, 224 provide means for recognizing the end of pulse trains when the break periods exceed predetermined break range of 44% to 72% of the pulse period.

Hence, it is seen that the circuitry leading to the Darlington circuit 222 eliminates noise and shapes dial pulses. Noise, such as contact bounce, disappears as it is integrated into the dial pulses by the charging capacitor 231, connected between the Darlingtonn circuit 222 and Schmidt trigger 223, 224. The amplifier 225 sends out dial pulses over DP lead 100. The transistor 224 sends the end of dial pulse train signals over the wire 101.

The observation device (FIG. 2) selectively monitors predetermined events occuring on the line during a telephone call, such as on hook and off hook conditions, supervision, and E and M lead signaling. For the on hook and off hook supervision, the tip and ring conductors T, R, T1, R1, are connected through the common control circuit 76 to a monitor lamp MON which lights to give a visual indication. In parallel therewith, a signal feeds over the lead OHS to the call disposition recorder of FIG. 4. For the supervision sisgnal, the SUPV lead is connected through a common control 76 to the supervision lamp SUPV and in parallel therewith over lead RS to the recorder 49, in FIG. 4. For multi-frequency signaling, signals are sent over the KP and ST leads in parallel with lamps which are not shown in FIG. 2, but are also shown at 48 in FIG. 1. (The T, R, T1, R1, SUPV leads appearing at the common control circuit 76 are common wires connected via an input circuit 55, 56 to similarly marked wires, shown in the upper lefthand corner of FIG. 2, for example).

The call disposition recorder 49 of FIG. 1B has a circuit, as shown by the block diagram of FIG. 4 which is connected to the circuit of FIG. 2 when a suitable plug and jack connection is made between the cabinets of FIGS. 1A and 1B. A simple side by side comparison of the reference characters on the leads in FIGS. 2 and 4 will indicate where the connections are made.

The purpose of the call disposition recorder is to provide a permanent or semi-permanent record of the trunk identification, number dialed, elapsed time, and disposition of a call, which are documented by the day and time. This call disposition recorder may be connected to operate responsive to only a faulty call condition. A sample of the transmission conditions on the line are preserved by an audio recording. And, a periodic summary of results is displayed or printed out for management purposes.

The cabinet of the call disposition recorder 49 (FIG. 1B) comprises a series of lamps 300 for selectively displaying the mode of operation being recorded at the moment. A series of windows 301 display the alpha numerical symbols as they are being recorded. A series of switches 302 control the recording operation. These switches include a print out switch 303, a reset switch 304, a suitable timer control selector 305, a power on-off switch 306, and one or more pilot lamps 307 for indicating the operating condition of the unit.

When operating in conjunction with the observation unit of FIGS. 2, 3, a data extraction switch 308 (FIG. 1A) is switchd to an "on" position. When a trunk is selected for observation, it activates the TRK IDENT lead 93, as described above. The signal on lead 93 (FIG. 4) starts a tape recorder 312 to record an audiospecimen and enables the storage of data in the call disposition recorder 49. As the call progresses, the observation unit of FIG. 2 stores the number dialed, KP/ST signals, and the elapsed time. In addition, the observation unit of FIG. 2 provides "on-off hook supervision" to the disposition recorder 49 via wire OHS. The voice path is also switched through via leads TCDR and RCDR to be monitored by independent detectors.

Subsequently, a disposition storage and recorder circuit 314 determines whether the call is completed, went to a busy line, or on re-order, experienced no ringing or no answer, or was completed with voice and no return supervision. The disposition recorder distinguishes between no return of supervision and no answer. Simultaneously, the disposition totalizer and display circuit 315 stores and visually indicates the total number of calls sampled and the total numbner of calls experiencing each disposition condition.

Responsive to an absence of "off hook supervision" for a period which is greater than one second, or twenty seconds after voice detection, the printout decoder 113 commands a sequencer 316 to go through a series of steps which interrogate each storage bin 74, 75 (FIG. 2) via the strobe advance lead AS and leads 94. The stored signals are then presented in binary form to an ASCII decoder 317 to permanently record the data received from FIG. 2 and the disposition of the call, together with documentation signals from clock-calendar 320, representing the day and time. At 321, recordings may be made on punched cards or tape, on magnetic tape, or by teletype printout.

A sample of the data printout at 321 might provide the following information:

Day: 000–365
Time: 0000–2400
Trunk Identification: 01–30
Dialed Number: Up to 14 digits
Start Dial & Stop Dial: KP, ST
Elapsed Time: 00–99 in seconds

| | NUMBER PRINTED |
|---|---|
| Completed Call: | 1 |
| Busy: | 2 |
| Reorder: | 3 |
| No Ring — No Answer: | 4 |
| Voice — No Supervision: | 5 |
| No Answer: | 6 |

At the end of the printout cycle, the sequencer 316 generates a "system reset" command signal for resetting the storage units in FIG. 4 and in FIG. 2, to prepare for the acceptance of another call.

Based on the setting of timer 323 every 30 minutes, 60 minutes, or perhaps, 4 hours, the sequencer 316 may self-initiate a data printout cycle. Thereupon, the punch or teletype printer makes a permanent record of all stored totals each disposition condition including a peg count representing the total number of calls sampled.

At a later date, the audio tape may also be played back in conjunction with a tape reader in order to analyze the quality of the audio channel transmission. Synchronization of the tape reader, punched or typed record, and the audio tape is preferably acheived by recording bursts of 1khz and 2khz stop and start tones on the tape during the recording cycle.

The 60 IPM busy signal detector, 120 IPM tone recorder signal detector, the ring back tone detector 328, and the voice detector 329 are used to detect when logic circuitry is required to make a disposition of the call. The synchronizing signals are simultaneously recorded on the audio tape in the call disposition recorder 49. In this manner, service observation may be made and coefficients or ratios of call completions may be derived on an automated basis. The live analysis of accumulated data may be conducted at any time which is convenient, if the summary is poor, thereby reducing the labor required to conduct telephone traffic and maintenance studies on a continuous basis. Or, the recorder may be connected to record only those calls which are not properly completed, thus providing only management exception information. The disposition information may also be stored in a buffer memory and remotely polled over telephone lines by a remote management center, for further computation and summarization.

Those who are skilled in the art will readily perceive how the circuit may be modified to perform the desired functions in a similar manner. Accordingly, the appended claims are to be construed to cover all equivalent structures.

I claim:

1. An automatic service observation circuit comprising means for connecting said observation circuit between each of a plurality of telephone or trunk lines and individually associated terminals, means for sequentially and individually scanning each of said plurality of terminals, means for discriminating between originating and terminating call conditions appearing at each of said individually associated terminals, and means responsive of said discriminating means for displaying dial signals appearing at said associated terminals.

2. The circuit of claim 1 wherein said dial signal displaying means comprises means for sequentially storing said dial signals as they are received at said terminals, strobe means for sequentially reading out and displaying each of said stored dial signals, and means for enabling said display means only during successive strobe periods thereby reducing power consumption and enabling reuse of common display means, said strobe periods recurring faster than the pertinent human senses can respond whereby said display appears to human senses as a continuous display.

3. The circuit of claim 2 wherein said display means include means for enabling a series of light-emitting diodes sequentially strobed in the order in which said dial signals appear.

4. The circuit of claim 2 wherein said display means includes a data read out means for converting information relating to said dial signals into a standard computer language, and means for feeding said standard language to peripheral read out equipment.

5. The circuit of claim 4 wherein said peripheral equipment comprises means for recording signals relating to call disposition events.

6. The circuit of claim 5 and means for detecting any of many different forms of dial signals in the audio signal path of said line, and means responsive to said detected dial signals in any form for recording synchronizing signals to coordinate data read out from said connector means with the audio events on said path.

7. The circuit of claim 5 and means for periodically storing the recorded signals in a permanent storage medium, and means for thereafter erasing said recording preparatory to recording new signals relating to call disposition events.

8. The circuit of claim 1 wherein said discriminating means comprises means for detecting busy conditions appearing on the line connected to the associated terminal, means for detecting seizure signals appearing on the line connected to the associated terminal, and means for switching a control condition to inhibit a response in said observation circuit if said busy condition is detected before said seizure signal is detected.

9. The circuit of claim 8 and means jointly responsive to said seizure signal and said control condition prior to said inhibit switching for stopping said scanning means to enable the observation circuit to exclusively serve the line having the seizure signal thereon.

10. The circuit of claim 9 and means for setting said observation circuit on a selected one of said terminals to at all times monitor all conditions on said selected terminals 11. The circuit of claim 9 and means for selectively enabling said observation circuit to lock up switch trains leading to said terminals whereby abusive calls may be trapped or malfunction traced.

12. The circuit of claim 1 and means for counting said dial signals as they appear, and means for responsive to a counting of a predetermined number of said dial signals before releasing succeeding dial signals to said display means whereby said predetermined number of dial signals are absorbed.

13. A call observation system comprising a plurality of input circuit means, each of said input circuits including means for coupling the input circuit to individually associated lines for monitoring events appearing thereon, means for detecting a call event on a line in any one of many commonly sent forms, scanner means for sequentially enabling each of said input circuit means to give the enable circuit exclusive access to said observation system means responsive to said detection of said call event on said line, means for stopping said scanner responsive to the detection of a call, whereby said observation system is temporarily assigned exclusively to serve the input circuit means identified by the stopped scannner, and common control for controlling the detection of said events and the display of signals representing said events appearing on the assigned line.

14. The observation system of claim 13 wherein the events being monitored are call completed conditions, busy conditions, re-order, no ring, no answer, voice, and supervision signals.

15. The observation system of claim 13 wherein the events being monitored are equipment identification, the value of numbers indicated by the digits dialed, start dial and stop dial signals, and elapsed time.

16. The observation system of claim 13 and means for selectively recording either the elapsed time between each of the events occuring on the assigned line or the total cumulative time of the call being observed.

17. The observation system of claim 13 and means for detecting control signals appearing on the associated telephone line, and signals comprising either successive series of dial pulse trains or successive combination of multiple frequency tone signals, storage means for storing the values represented by said control signals, means for sequentially feeding the dial pulses in each series to said storage means, means for decoding said tone combinations into parallel markings, and means for feeding said parallel markings to said storage means.

18. The observation system of claim 13 and dial pulse detector means operated responsive to pulses having pulse periods with make and break periods having a predetermined make-break ratio range, timer means for integrating all signals appearing within said predetermined make range whereby contact bounce and similar noise signals are integrated into said make period.

19. The observation system of claim 18 and means for recognizing the end of pulse trains responsive to break periods exceeding said predetermined break range.

20. The service observation system of claim 13 and means for displaying information relating to the events occuring during a call under observation, means for displaying an identification of equipment involved in said call, and means for displaying both the elapse of time occuring during said call and the elapse of time occuring between the events causing the information being displayed.

21. The service observation system of claim 13 wherein said time display means comprises means for manually controlling the measuring of the time, means for automatically measuring a predetermined time period, and means for selectively expanding said automatically measure of time period by multiple amounts.

22. The service observation system of claim 21 and means for resetting said time measure means after each event observed during said call.

23. The service observation system of claim 21 and means for measuring the cumulative time period elapsing throughout the entire call under observation.

24. An observation system of claim 13 and means for selectively monitoring predetermined ones of the events occurring on the line during a telephone call, means fo monitoring on hook and off hook conditions on the line, and means for displaying information relating to the monitored events.

25. The system of claim 24 and means for indicating the supervision signals on the line.

26. The system of claim 24 and means for monitoring and displaying E and M signaling conditions associated with the line.

27. The system of claim 13 and means for storing and reading out a summary of the disposition of the calls observed by said system.

28. The system of claim 13 and means for only storing information relative to calls indicating trouble conditions.

29. The system of claim 13 and a call disposition information recorder means, and means for periodically forwarding information stored in a call disposition recorder to a remote location.

30. The system of claim 13 and call disposition information recorder means, means responsive to said common control means for recording said detected events appearing on said line.

31. The system of claim 30 and means whereby said call disposition information recorder mean only records information responsive to faulty call conditions.

32. The system of claim 31 and means wherein said call disposition information recorder records equipment information, number dialed, elapsed time, and disposition of call.

* * * * *

UNITED STATES PATENT AND TRADEMARK OFFICE

CERTIFICATE OF CORRECTION

PATENT NO. : 3,917,915

DATED : November 4, 1975

INVENTOR(S) : Ernest C. Karras

It is certified that error appears in the above-identified patent and that said Letters Patent are hereby corrected as shown below:

Column 1, line 30, change "error" to --occur--

Column 2, line 23, after "1A" insert --is--

Column 6, line 36, change "thooght" to --thought--

Column 6, line 50, change "discuminator" to --discriminator--

Column 7, line 67, change "pin" to --bin--

Column 10, line 65, change "105" to --205--

Column 11, line 16, change "nor" to --not--

Column 11, line 35, change "repsonse" to --response--

Column 11, line 41, change "times" to --timer--

Column 11, line 49, change "providess" to --provides--

Column 11, line 59, change "dual" to --dial--

Column 12, line 1, after "P21," delete the rest of line

Column 12, line 2, delete "dial pulse make period as shown at P21,"

Column 12, line 59, change "sisgnal" to --signal--

UNITED STATES PATENT AND TRADEMARK OFFICE

CERTIFICATE OF CORRECTION

PATENT NO. : 3,917,915

DATED : November 4, 1975

INVENTOR(S) : Ernest C. Karras

It is certified that error appears in the above-identified patent and that said Letters Patent are hereby corrected as shown below:

Column 13, line 52, change "numbner" to --number-- (second occurence)

Column 16, claim 13, line 1, change "enable" to --enabled--

Column 16, claim 24, line 67, change "fo" to --for--

Signed and Sealed this

*sixth* Day of *April 1976*

[SEAL]

*Attest:*

RUTH C. MASON
*Attesting Officer*

C. MARSHALL DANN
*Commissioner of Patents and Trademarks*